W. C. CORYELL.
MACHINE FOR MAKING BUILDING FABRIC.
APPLICATION FILED JULY 9, 1919.
1,353,456.
Patented Sept. 21, 1920.
5 SHEETS—SHEET 1.
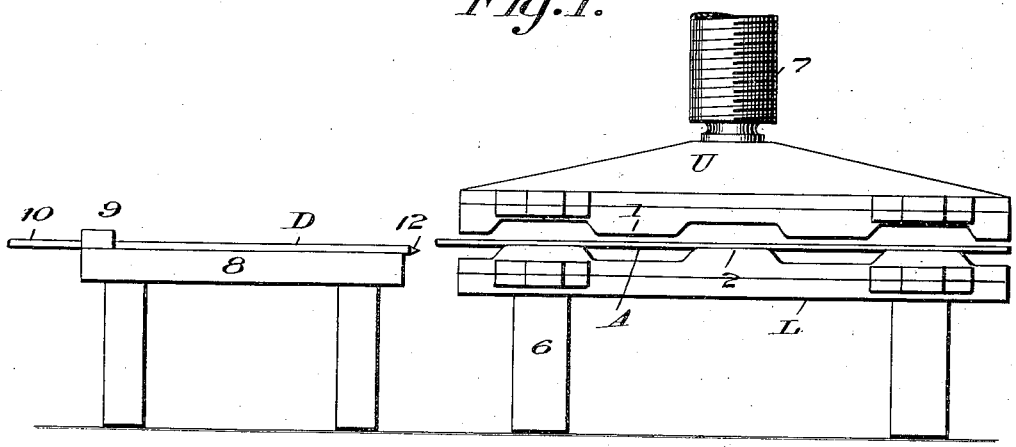
Fig. 1.
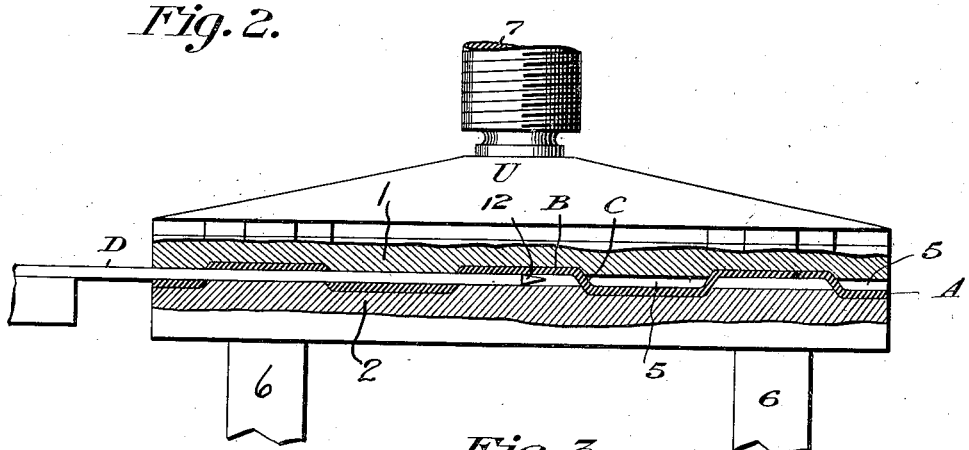
Fig. 2.
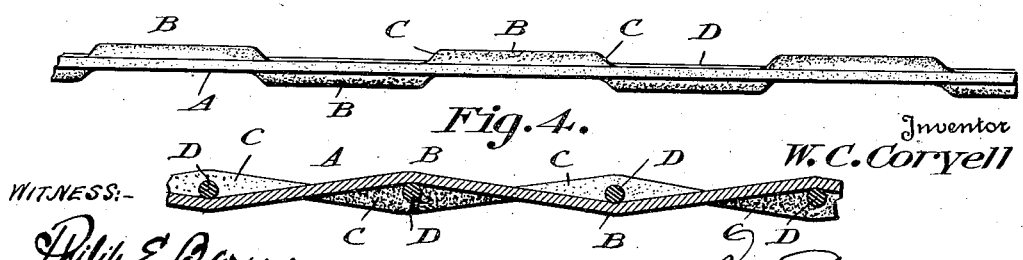
Fig. 3.
Fig. 4.
WITNESS:—
Philip E. Barnus
Inventor
W. C. Coryell
By
Attorney

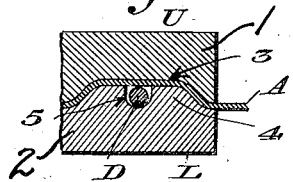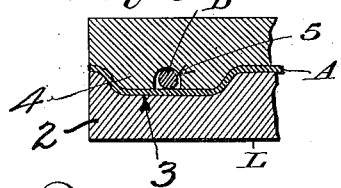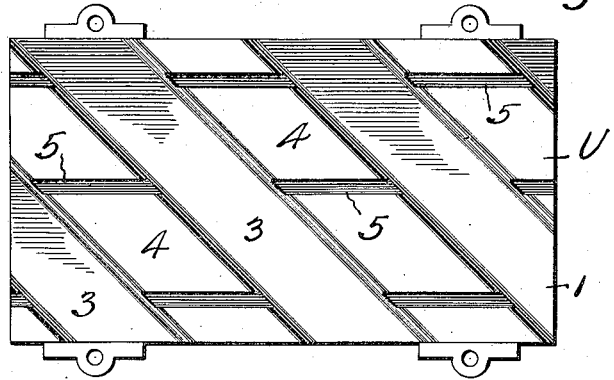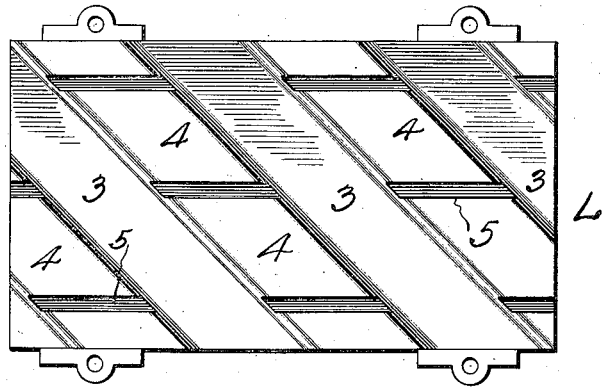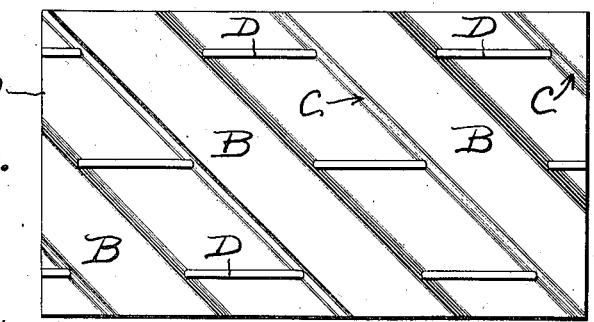

UNITED STATES PATENT OFFICE.

WILLIAM CLAYTON CORYELL, OF YOUNGSTOWN, OHIO, ASSIGNOR TO THE GENERAL FIREPROOFING COMPANY, OF YOUNGSTOWN, OHIO, A CORPORATION OF OHIO.

MACHINE FOR MAKING BUILDING FABRIC.

1,353,456.  Specification of Letters Patent.  Patented Sept. 21, 1920.

Application filed July 9, 1919. Serial No. 309,630.

*To all whom it may concern:*

Be it known that I, WILLIAM CLAYTON CORYELL, citizen of the United States, residing at Youngstown, in the county of Mahoning and State of Ohio, have invented certain new and useful Improvements in Machines for Making Building Fabric, of which the following is a specification.

This invention relates to the manufacture of building material of the character used as a form or matrix for receiving and holding wall plaster, stucco, cement or other surfacing material and which may also be employed as a panel material.

To that end the invention primarily has in view the provision of a machine of simple and practical construction and embodying means for economically and expeditiously manufacturing that class of building material or building fabric employed chiefly as a substitute for wooden and metal lathing. In the present state of this art, that is the art of making paper or equivalent lathing, both reinforced and unreinforced, there is a lack of suitable machinery for satisfactorily and commercially making such a product on a proper scale to meet the requirements of the trade. The hand processes which have been resorted to for that purpose are tedious and expensive besides not giving the uniform results as is possible with a well designed machine.

Accordingly, it is the purpose of the present invention to satisfactorily meet the conditions and requirements above indicated by providing a machine which will enable the manufacturer to produce with economy and reasonable rapidity a building fabric having the necessary structural and functional characteristics adapting it for the requirements of the building trade.

With these and other objects in view which will more readily appear as the nature of the invention is better understood the same consists in the novel construction, combination and arrangement of parts hereinafter more fully described, illustrated and claimed.

The essential structural features of the machine which provide for preparing the paper or equivalent body sheet and the interweaving of metal reinforcements therewith are susceptible of a wide range of modification without departing from the scope of the invention but certain preferred and practical embodiments are illustrated in the accompanying drawings, in which:—

Figure 1 is a side elevation of the essential coöperating elements of a machine constructed in accordance with the present invention for making a building fabric or material; the view showing the forming die separated, and the body sheet in position ready to be crimped.

Fig. 2 is a similar view with the forming dies closed, on a line of section including a longitudinal row of forming dies showing the crimped sheet and a metal reinforcing rod partly threaded through the same.

Fig. 3 is an enlarged elevational view of a section of the building fabric with the body sheet crimped and the metal reinforcement inserted as provided for by the operations of the machine.

Fig. 4 is a cross-sectional view of the reinforced fabric in the form it usually appears as it leaves the machine.

Fig. 10 is a detail sectional view of one of the die units of the complete forming die shown by Figs. 7 and 8, the line of section being indicated by the line 10—10 on Fig. 8.

Fig. 11 is a view similar to Fig. 10 of another die unit with the line of section being indicated by the line 11—11 on Fig. 7.

Fig. 12 is a plan view of the bottom face of the upper forming die modified to provide for a diagonal arrangement of the reinforcing members.

Fig. 13 is a plan view of the upper face of the lower forming die which is the complement or mate of the upper die member shown in Fig. 12.

Fig. 14 is a plan view of the building fabric with the staggered reinforcement provided for by the forming die members of Figs. 12 and 13.

Like references designate corresponding parts in the several figures of the drawings.

Figure 9:
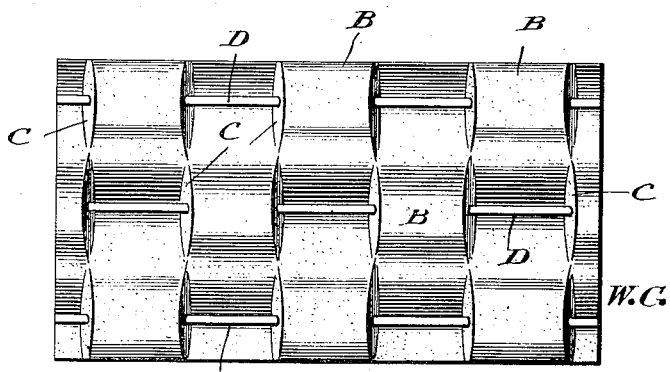
Fig. 9 is a plan view of the building fabric having the arrangement of reinforcing members as provided for by the forming die shown in Figs. 7 and 8.
Figure 17:
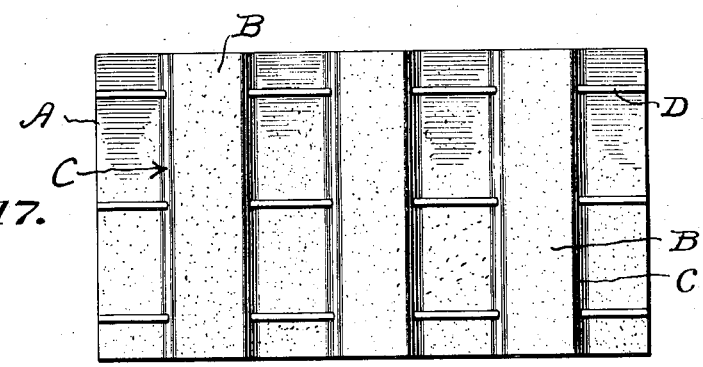
Fig. 17 is a plan view of the fabric made with the dies of Figs. 15 and 16.

The present machine is designed with special reference to the manufacture of a building fabric or building material having certain structural characteristics. In the main such a fabric or material consists of a paper or equivalent crimped body sheet having rows of corrugations, and metallic reinforcing members threaded through the corrugations. This body sheet is designated in the drawings by the letter A and the lateral undulations of one form of the fabric shown in Fig. 4 of the drawings, while in Fig. 3 of the drawings is shown the longitudinally corrugated feature providing the longitudinal rows of corrugations B whose walls C are pierced by straight or substantially straight metal reinforcing members D consisting of a metal wire, rod or strip. This construction provides for disposing each metallic reinforcing member partly on one side of the sheet and partly on the other side of the sheet, and according to the design of the forming dies the portions of the reinforcing members on one side of the sheet may be arranged in staggered formation as shown in Fig. 9, that is in staggered order but in diagonal rows on each side of the sheet as shown in Fig. 14, or in parallel traverse rows as shown in Fig. 17. This illustrates the scope of the invention and the adaptability of the machine to provide for different dispositions of the reinforcing members as may be desired or required.

The machine for producing a fabric or material having the structural features referred to embodies in its organization primarily a forming die F comprising upper and lower die members U and L respectively having their opposing die faces complementally and similarly formed to give to the body sheet the crimped formation shown in Figs. 3 and 4 as well as to provide for the threading of the reinforcing members therethrough while held in a crimped condition. That is to say the die members U and L are provided upon their die faces with a series of transverse rows of die units (where more than one reinforcing member is used as is usually the case). The die units of each transverse row may constitute a single unitary construction (as shown) or may be separately assembled parts on the die platens without departing from the invention. Therefore it will be understood that each die unit (see Figs. 10 and 11 of the drawings) is that part of the forming die producing the proper crimp in the sheet at the locations where the metal reinforcement is threaded therethrough, and referring to Figs. 7 and 8 and 10 and 11 of the drawings it will be noted that each die unit in every transverse row of such units essentially consists of the upper and lower die blocks 1 and 2 constituting portions or units of the upper and lower die members U and L. One of said die blocks is provided therein with a die recess or seat 3 forming the female die element for the die projection or tenon 4 of the opposite die block, the said two die elements 3 and 4, when brought into registration serving to crimp the body sheet with a corrugation at the reinforcement receiving location. And, to provide means whereby the metal rod or other reinforcement may be inserted or threaded through the walls C of the corrugations thus formed the male die projection or tenon is provided in the crown thereof with a longitudinally disposed guiding groove 5 which is in alinement with similar guiding grooves for the same longitudinal row of corrugations through which the metal rod or reinforcement is to be passed.

Figure 7:
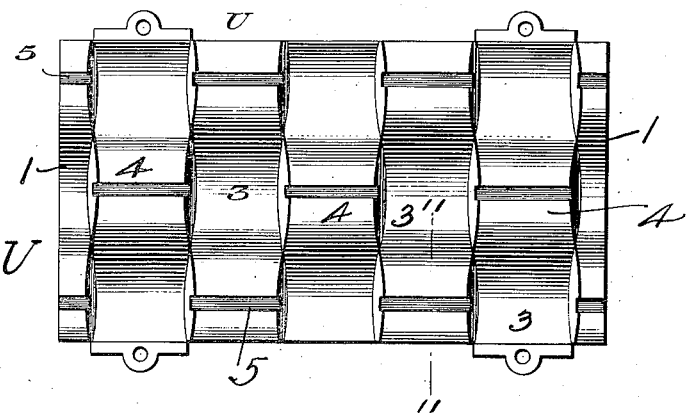
Fig. 7 is a plan view of the bottom face of the upper forming die of the machine providing for one arrangement of the reinforcing members.
Figure 8:
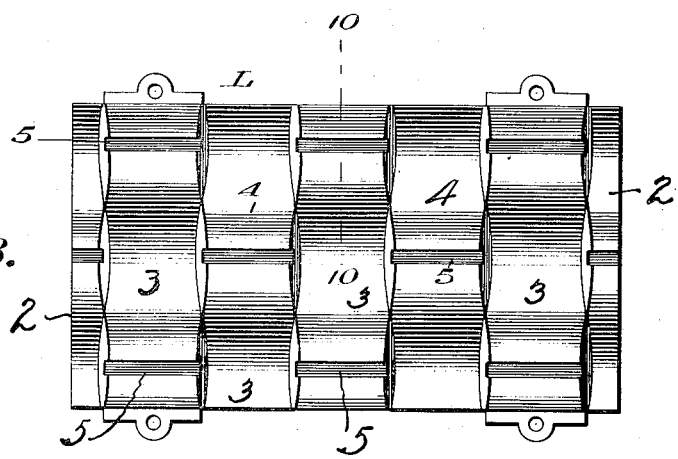
Fig. 8 is a plan view of the top piece of the lower forming die which forms a complement or mate with the die shown in Fig. 7.

The die formation shown in Figs. 7 and 8 of the drawings is adapted for producing the fabric shown in Fig. 9 of the drawings wherein the portions of the metal reinforcement in the same transverse row all lie in staggered order on the same side of the sheet. In that connection it will be seen by reference to Figs. 7, 8, 10 and 11 of the drawings that where the portion of the reinforcing member is to lie at what may be termed the under side of the body sheet the reinforcement guiding groove will be in the lower die block 2 (as per Fig. 10) while in the next transverse row of die units where the portions of the reinforcement are to lie on the upper side of the sheet the guiding grooves 5 are provided in the upper die blocks. Likewise for these alternate positions the mating die elements of the die units are alternately reversed.

Figure 5:
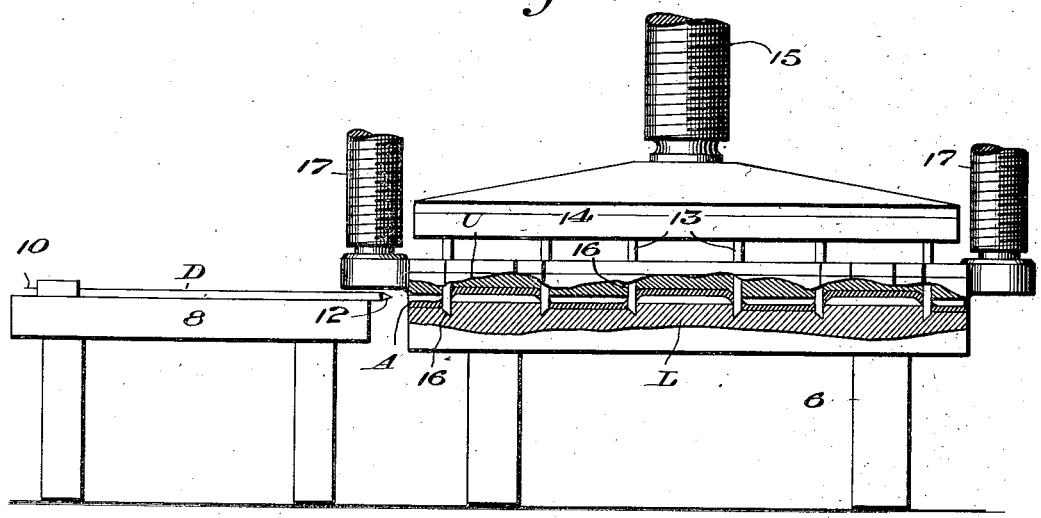
Fig. 5 is a sectional elevation of a modified form of the machine employing perforating cutters to provide threading holes in the body sheet for the metal reinforcement; the view showing the forming dies closed and the perforating cutters piercing the body sheet.
Figure 6:
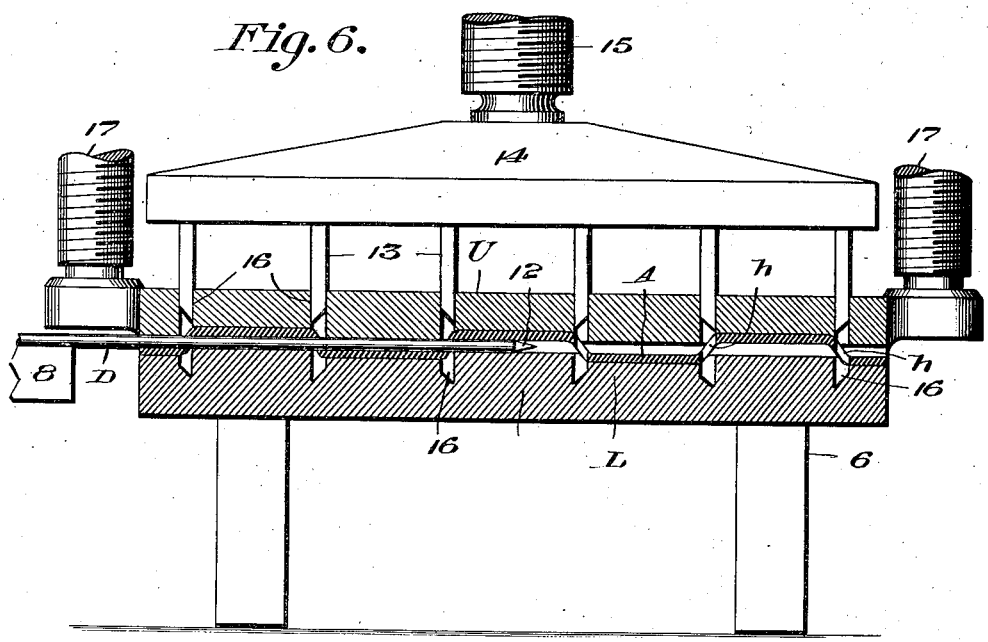
Fig. 6 is a view similar to Fig. 2 of the modification illustrated in Fig. 5 with the perforating cutters withdrawn and the metal reinforcement threaded partly through the perforations of the crimped sheet.

The upper and lower die members U and L having the die conformation described are adapted to be operated in connection with any ordinary press or die machine, so the usual and various parts of such machines are not shown in the accompanying drawings but for purpose of illustration the upper and lower die members U and L are shown in Figs. 1 and 2 in their operative relation with the lower die member L mounted on a suitable base or support 6 and the upper die member U having associated therewith a screw or similar pressure producing device 7 which may be operated in any suitable manner to lower and raise the upper member U to provide respectively for crimping the body sheet and holding it in such condition and for then separating the die after the metal reinforcements have been introduced and the fabric completed. In Fig. 1 of the drawings the forming die is shown in its open condition with the flexible fibrous or equivalent body sheet A inserted in place while Fig. 2 of the drawings shows the forming die closed and the body sheet crimped to the form ready to receive the metal reinforcing members D. The feeding of these reinforcing members into this machine and causing the same to be interwoven with the body sheet may be accomplished in various ways but conveniently by the use of a feeding table 8 arranged at one side of the lower die member L and adapted to support the reinforcing members D thereon. Associated with the feeding table 8 is a pusher head 9 or equivalent device operated by a suitably controlled feeding rod or equivalent device 10 to provide means, with the head 9 in engagement with one end of the metal reinforcement D, for forcibly feeding the said member through the longitudinal alined guiding grooves 5 and through the walls C of the longitudinal row of corrugations B. When manufacturing a comparatively thin and light fabric with a stiff metal reinforcement it is usually only necessary as indicated in Figs. 1 and 2 of the drawings to force the metal reinforcement through the body sheet and this operation may be facilitated by providing the metal reinforcement with a piercing or entering point 12. On the other hand with a thick or tough fabric or with slender or light reinforcements it may be necessary to employ means for cutting threading holes $h$ through the walls of the corrugations at the time of crimping the body sheet. That may be readily accomplished by associating with the upper and lower members of the forming die perforating cutter pins or slitting knives 13 carried by a cutter head 14 operated by a suitably controlled screw or equivalent raising and lowering device 15 and adapted to work through vertical guiding openings 16 in the die members. This form of the machine is shown in Figs. 5 and 6 of the drawings and as illustrated thereby the upper die member U may be operated independently of the perforating cutter by means of the screw or equivalent pressure devices 17 to provide for crimping the sheet while the cutters 13 may be independently operated to pierce the wall C of the body sheet with holes or slits through which the metal reinforcements are threaded by the action of the feeding device 9—10. It will of course be understood that after lowering the cutter to provide the threading holes or slits $h$, the cutter is then caused to retreat out of the way of the entering metal reinforcements which are fed through the body sheet.

The structural formation of the die members shown in Figs. 12 and 13 is the same as the formation of the die member shown in Figs. 7 and 8. The difference in the die members of Figs. 12 and 13 resides in the diagonal or oblique arrangement of the transverse rows of die units so as to produce a diagonal arrangement of the die units with the result of providing means for obliquely disposing the portions of the reinforcement lying respectively on opposite sides of the body sheet as shown in Fig. 14 of the drawings.

Figure 15:
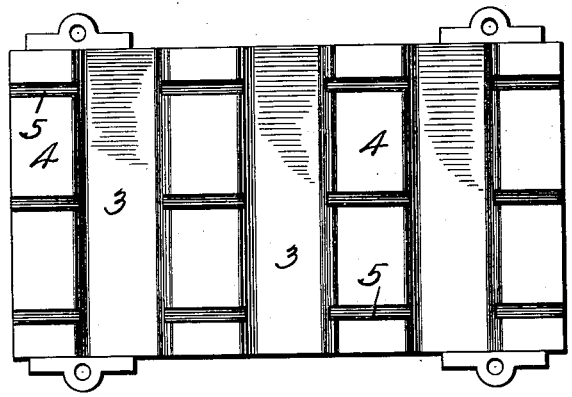
Figs. 15 and 16 are plan views of the die faces of the complemental forming dies designed to produce another arrangement of the reinforcing members.
Figure 16:
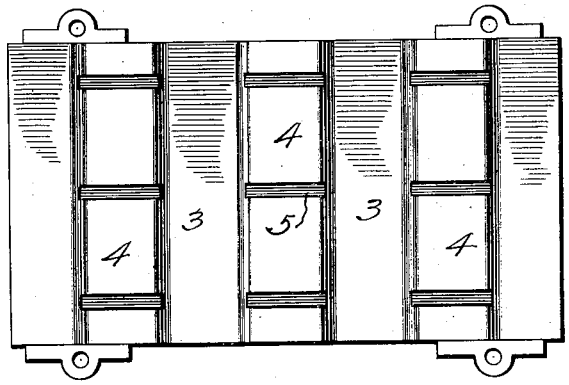

The die formation of Figs. 15 and 16 produces a fabric as shown in Fig. 17 in which the reinforcement members on each side of the sheet are disposed in regular parallel transverse rows.

From the foregoing it is thought that the construction, operation and advantages of the herein described machine for making building fabric will be apparent without further description and it will be understood that changes in the form, proportion and minor details of construction may be resorted to without departing from the spirit of the invention or scope of the appended claims.

I claim:—

1. A machine for making building fabric including a device having means for upsetting portions of a body sheet, and means for inserting a reinforcement through said upset portions of the sheet.

2. A machine for making building fabric including a forming die having means for upsetting portions of the fabric sheet, and means for inserting reinforcement through said upset portions of the sheet.

3. A machine for making building fabric including a forming die having means for forming sheet material with upset wall portions, and means for threading a reinforcement through said upset wall portions.

4. A machine for making building fabric including a forming die having means for crimping the sheet material, and means for weaving a reinforcement through said material while held in crimped condition.

5. A machine for making building fabric including a device having means for pressing and holding the fabric sheet, and means for weaving and threading a metal reinforcement therethrough while so held.

6. A machine for making building fabric including a device having means for pressing and holding sheet material, and means for causing a metal reinforcement to be threaded through the sheet material alternately upon opposite sides thereof.

7. A machine for making building fabric including a forming die having means for crimping the fabric sheet with longitudinal rows of corrugations, and means for threading a metal reinforcement through the corrugations of each row.

8. A machine for making building fabric including a forming die having means for crimping the fabric sheet to form longitudinal rows of corrugations, and means for threading a straight reinforcement through each row of corrugations while the sheet is held in crimped condition.

9. A machine for making building fabric including a forming die having means for crimping the fabric sheet, means for forming openings in the sheet, and means for feeding a metal reinforcement in and through said openings.

10. A machine for making building fabrics including a forming die having means for crimping the fabric sheet, means for perforating the sheet in rows, and means for feeding a metal reinforcement into and through each row of perforations.

11. A machine for making building fabric including a forming die having means for crimping the fabric sheet, means for perforating wall portions of the crimp and means for causing a metal reinforcement to be woven with the sheet by threading the same through the perforations thereof.

12. A machine for making building fabric including a forming die comprising upper and lower mating die members having transverse rows or die units, each of which units is provided with sheet crimping means.

13. A machine for making building fabric including a forming die comprising upper and lower mating die members having transverse rows or die units, each of which units is provided with sheet crimping means and with reinforcement guiding means.

14. A machine for making building fabric including a forming die comprising upper and lower die members and having a plurality of transverse rows or die units, each die unit consisting of opposing die blocks respectively having a die recess and a die projection.

15. A machine for making building fabric including a forming die comprising upper and lower die members and having a plurality of transverse rows or die units, each of said die units consisting of opposing die blocks respectively having a die recess and a die projection and a reinforcement guiding groove crossing the die projection.

16. A machine for making building fabric including a forming die comprising upper and lower die members having a plurality of complemental die recesses and die projections and reinforcement guiding grooves in the die projections, the reinforcement guiding grooves of all of the die projections being longitudinally alined in parallel rows.

In testimony whereof I hereunto affix my signature in the presence of two witnesses.

WILLIAM CLAYTON CORYELL.

Witnesses:
 Roy T. Law,
 H. E. White.